Dec. 17, 1929.  J. C. McCUNE  1,739,603
COMPRESSOR VALVE
Filed Oct. 28, 1927

INVENTOR
JOSEPH C. McCUNE
BY *Wm. M. Cady*
ATTORNEY

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

COMPRESSOR VALVE

Application filed October 28, 1927. Serial No. 229,392.

This invention relates to fluid compressors and more particularly to the discharge valves therefor.

An object of my invention is to provide a discharge valve mechanism for fluid compressors which is simple in construction and efficient in operation and which will operate without making objectionable noise.

Another object of my invention is to provide a discharge valve mechanism for fluid compressors, in which the discharge valve, when the compressor is operated at high speed, will be acted upon by two springs of different capacities to move it toward its seated position until such time as the action of the spring having the greatest capacity is interrupted when the spring of lesser capacity will cause the valve to move to its seated position independently of the other spring, or in which, the discharge valve, when the compressor is operated at low speed, will be acted upon only by the spring having the lesser capacity.

Other objects and advantages will appear from the following more detailed description.

Figure 1:
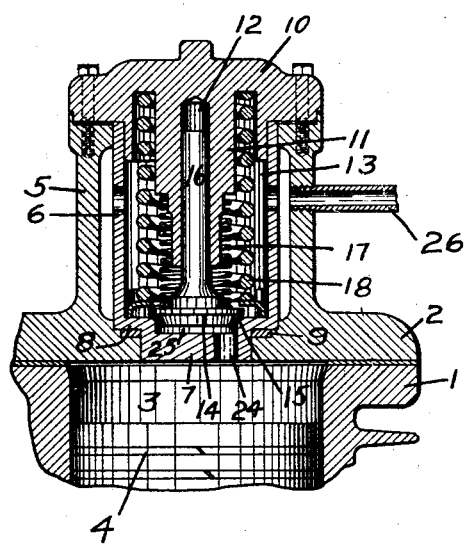
Figure 2:
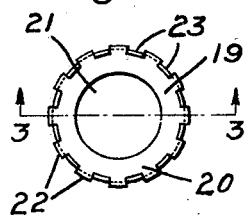
Figure 3:
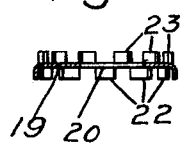

In the accompanying drawing, in which like reference characters refer to like parts, Fig. 1 is a vertical sectional view of a portion of a fluid compressor embodying my invention; Fig. 2 is a plan view of a spring seat forming part of the discharge valve mechanism; and Fig. 3 is a sectional view through the spring seat taken on the line 3—3 of Fig. 2.

In the accompanying drawing, the reference character 1 indicates the casing of a fluid compressor, which casing may be of the usual form and has a head 2 secured thereto in any desired manner. Contained within a chamber 3, which is formed by the casing 1 and head two, there is a compression piston 4 which may be operated through the medium of the usual mechanism (not shown).

The head 2 of the compressor has a hollow, outwardly extending annular portion 5, which is preferably integral with the head, and contains a hollow annular valve seat member 6 having a contracted end portion 7 adapted to extend into an opening in the head 2; and having an annular shoulder 8, the outer surface of which is adapted to seat on a gasket 9 mounted on the head 1, and is secured in air tight relation therewith, by a cap 10 secured to the portion 5 of the head by bolts or any other desired means. This cap member has a central downwardly depending projection 11 having a central bore 12.

Contained within a discharge valve chamber 13 is a valve 14 adapted to seat on a valve seat 15 and having a stem 16 slidably mounted in the bore 12 of the projection 11, to guide the valve in its operation.

Also contained within the chamber 13, are springs 17 and 18 which are for the purpose of operating the valve 14 in one direction and for cushioning the valve in the opposite direction. One end of the spring 17 is seated on the inner face of the valve 14, while the opposite end is seated on a shoulder on the projection 11. The spring 18 is of greater capacity than the spring 17 and surrounds this latter spring and the projection 11, and has one end seated on the cap 2 and the other end upon a horizontally disposed flat portion 19 of a spring seat 20, which flat portion has a central aperture 21, through which the stem 16 of the valve 14 and the spring 17 is adapted to extend. This aperture 21 is of less diameter than the diameter of the valve 14, so that when the valve is caused to move upwardly beyond a predetermined distance, it will engage and move the spring seat 21 with it. The outer edge portion of the spring seat is provided with alternate downwardly and upwardly extending lugs or projections 22 and 23, respectively, the projections 22 being adapted to seat on the inner surface of the shoulder 8 of the valve seat member 6 and are of such a length that there will be sufficient clearance between the inner face of the valve 14 and the flat portion 19 of the spring seat 20 to permit the valve 14, under certain conditions, to operate independent of the spring seat. The projections 23 may be of any desired length and serve to maintain the spring 18 in its proper position on the spring seat.

When the compressor is operated at slow speed, fluid compressed by the piston 4 will flow from the chamber 3, through an aperture 24 to a chamber 25 at one side of the valve 14, causing the valve to move upwardly just far enough to permit the fluid under pressure to flow past the valve into the chamber 13. From thence the fluid flows through apertures in the valve seat member to a pipe 26 leading to other parts of the fluid pressure system. It will here be noted that the valve does not move far enough to engage the spring seat 20 so that, when the piston 4 has completed its compression stroke and is on its return stroke, the spring 17 of light capacity which has been compressed by the upward movement of the valve, returns the valve to its seat more quietly than would be possible if the spring 18 were used to return the valve to its seated position.

When the compressor is operated at high speed, the valve 14 unseats and engages and moves the spring seat 20 upwardly, compressing both springs 17 and 18, and both act upon the valve 14 to move it toward its seated position until such time as the projections 22 of the spring seat come to rest on the shoulder 8, when the spring 17 causes the valve to be seated entirely independently of the spring 18.

From the foregoing description it will be seen that, under all conditions, the spring 17, of light capacity, will cause the valve to seat entirely independently of the spring 18 of heavy capacity and will thus ensure the quite operation of the valve without in any way affecting the efficiency or positive operation thereof.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination in a fluid compressor having a cylinder, of a valve seat member, a discharge valve normally seated on said valve seat member and adapted to be unseated to discharge fluid under pressure from said cylinder, a spring adapted to cooperate with said valve to move it toward its seated position, a seat for said spring movable with said valve and adapted to come to rest on said valve seat member before said valve is seated, and a spring extending through said seat for seating said valve when said spring seat comes to rest on said valve seat member.

2. The combination in a fluid compressor having a cylinder, of a normally seated discharge valve adapted to be unseated to discharge fluid under pressure from said cylinder, a spring seated on said valve opposing the initial opening movement of said valve, a spring seat spaced from said valve and having an opening through which the first mentioned spring extends, and a spring seated on said spring seat opposing further opening movement of said valve.

3. The combination in a fluid compressor having a cylinder, of a compressor head, a valve seat member mounted in said head, a shoulder on said member, a discharge valve, a spring seat normally resting on said shoulder in spaced relation with said valve, a spring interposed between said valve and head and extending through said spring seat, and a spring interposed between said seat and head, the last mentioned spring being adapted to oppose the opening movement of said valve only after said valve engages said seat.

4. The combination in a fluid compressor having a cylinder, of a compressor head, a valve seat member mounted in said head, a shoulder on said member, a discharge valve, a spring seat having depending lugs adapted to normally seat on said shoulder to space said spring seat from said valve, a spring extending through said spring seat and opposing an initial opening movement of said valve, and a spring seated on said spring seat opposing a further opening movement of said valve.

5. The combination in a fluid compressor having a cylinder, of a compressor head, a valve seat member mounted in said head, a shoulder on said member, a discharge valve, a spring seated on said valve for opposing the initial opening movement of the valve, a spring seat having a horizontally disposed web, lugs extending outwardly from said web adapted to seat on said shoulder and space said web from said valve, a spring seated on said web adapted to oppose a further opening movement of said valve, and lugs extending outwardly from said web adapted to maintain the last mentioned spring against transverse movement.

In testimony whereof I have hereunto set my hand.

JOSEPH C. McCUNE.